United States Patent [19]
Anthony, Jr. et al.

[11] 3,843,890
[45] Oct. 22, 1974

[54] OPTICAL-ELECTRICAL WEB INSPECTION SYSTEM

[75] Inventors: John D. Anthony, Jr.; Mark E. Faulhaber; Edmund H. Smith, Jr., all of Wilmington, Del.

[73] Assignee: E.I. du Pont de Nemours and Company, Wilmington, Del.

[22] Filed: July 27, 1973

[21] Appl. No.: 383,289

[52] U.S. Cl................ 250/563, 250/572, 250/227, 250/214 R, 356/239
[51] Int. Cl.......................................... G01n 21/32
[58] Field of Search........................ 250/560–563, 250/571, 572, 236, 227, 214 R; 356/199, 200, 168, 237, 239, 159, 160

[56] References Cited
UNITED STATES PATENTS

| | | | |
|---|---|---|---|
| 3,001,080 | 9/1961 | Neil | 250/562 |
| 3,061,731 | 10/1962 | Thier et al. | 356/200 X |
| 3,427,462 | 2/1969 | Cist | 250/562 |
| 3,493,769 | 2/1970 | Revesz et al. | 250/214 R |
| 3,556,664 | 1/1971 | Blaisdeil et al. | 356/200 |
| 3,646,353 | 2/1972 | Bhullar et al. | 356/200 X |
| 3,728,548 | 4/1973 | Pinior | 250/227 X |
| 3,744,905 | 7/1973 | Smith | 356/168 X |

Primary Examiner—Walter Stolwein

[57] ABSTRACT

An automatically calibrated flying spot web inspection system adapted to detect three different classes of defects and discriminate as to defect class. Electronic means responsive to a beam of radiation in either the reflection mode or the transmission mode detect sharp edge defects, diffuse edge defects and protracted duration defects.

5 Claims, 11 Drawing Figures

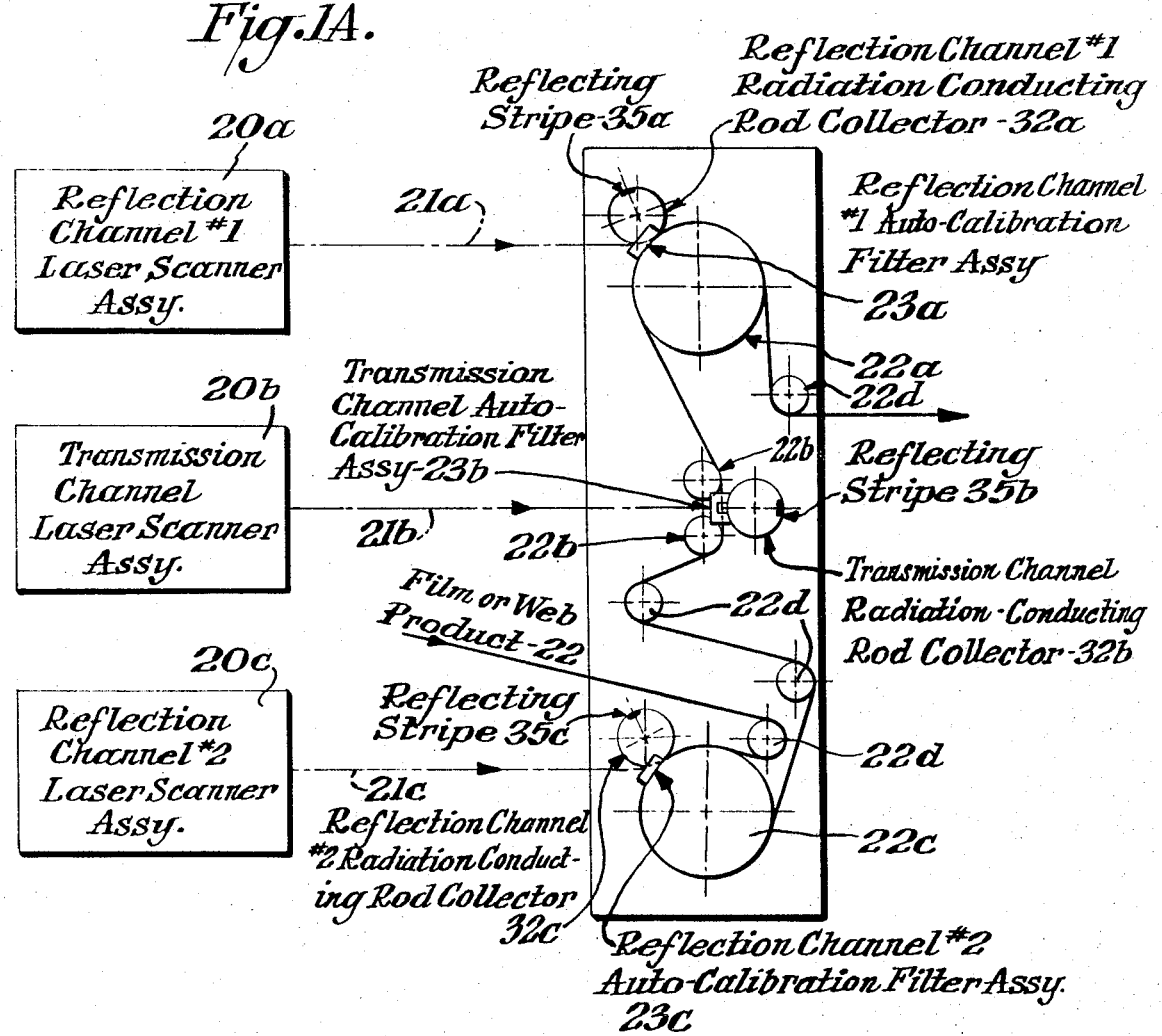
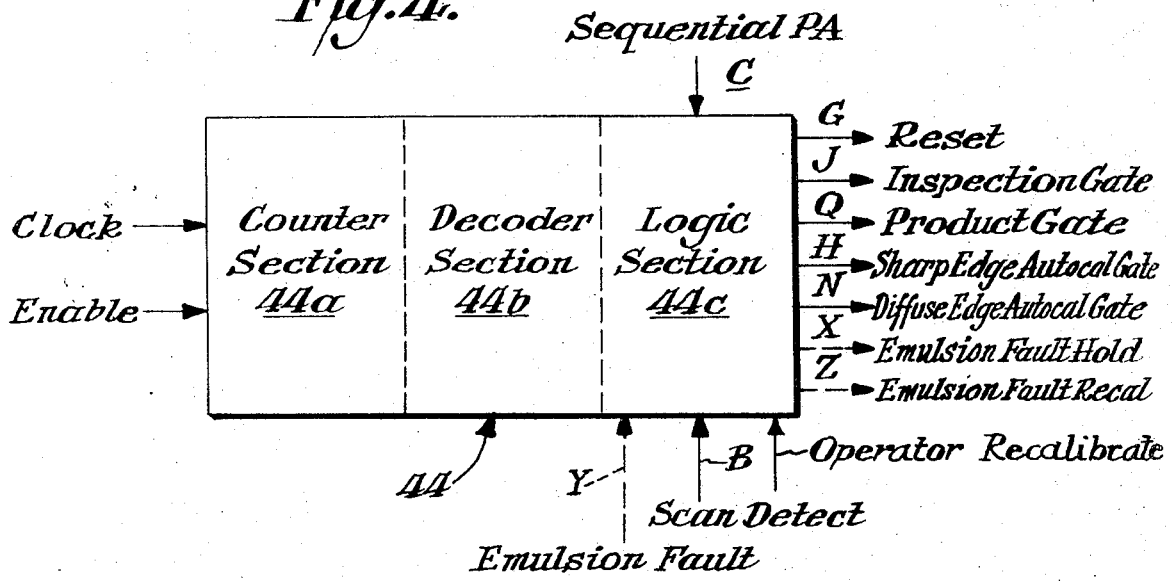

Fig. 3.
Normal Product Waveforms
Faulty Product Waveforms
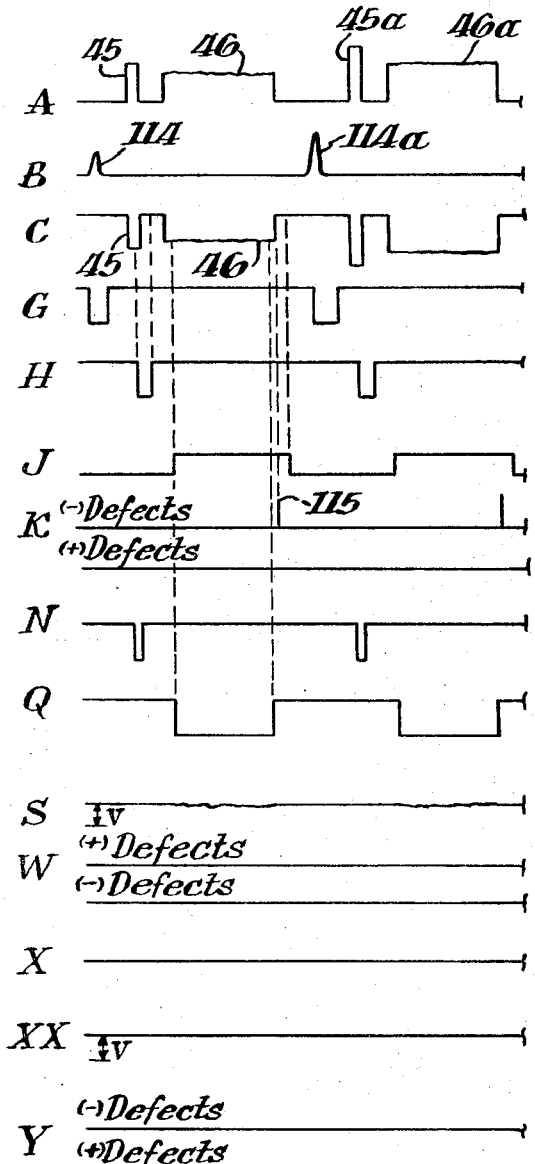
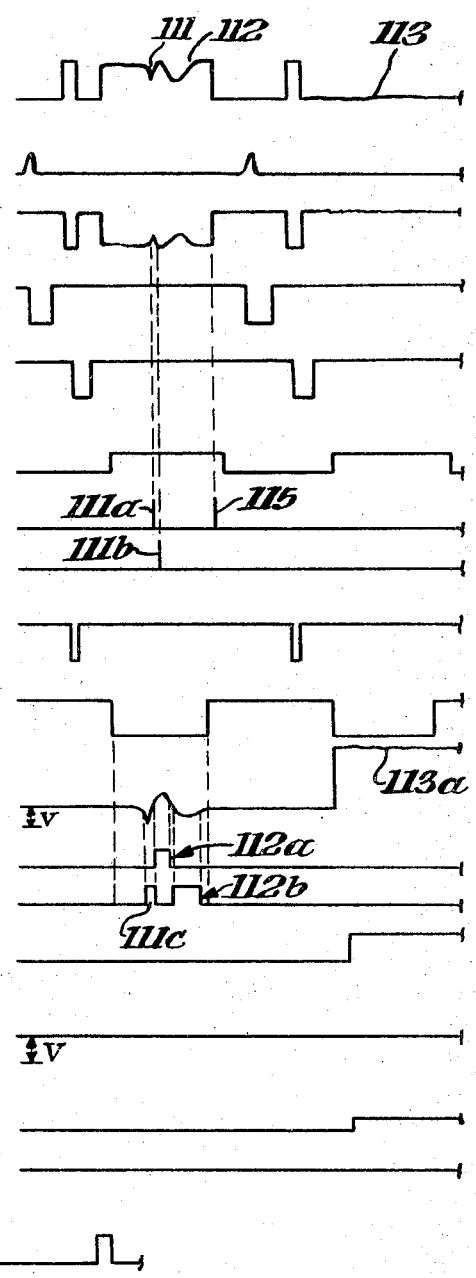

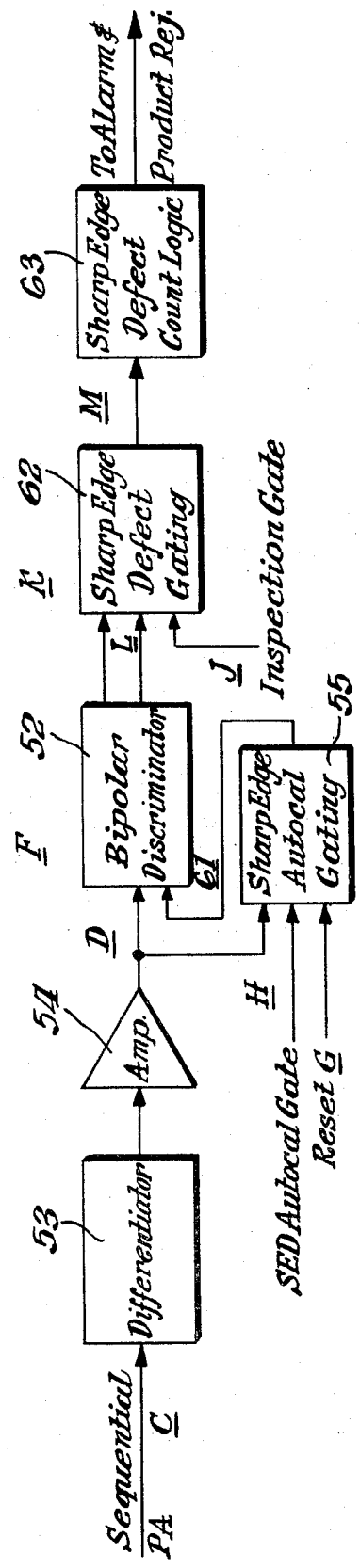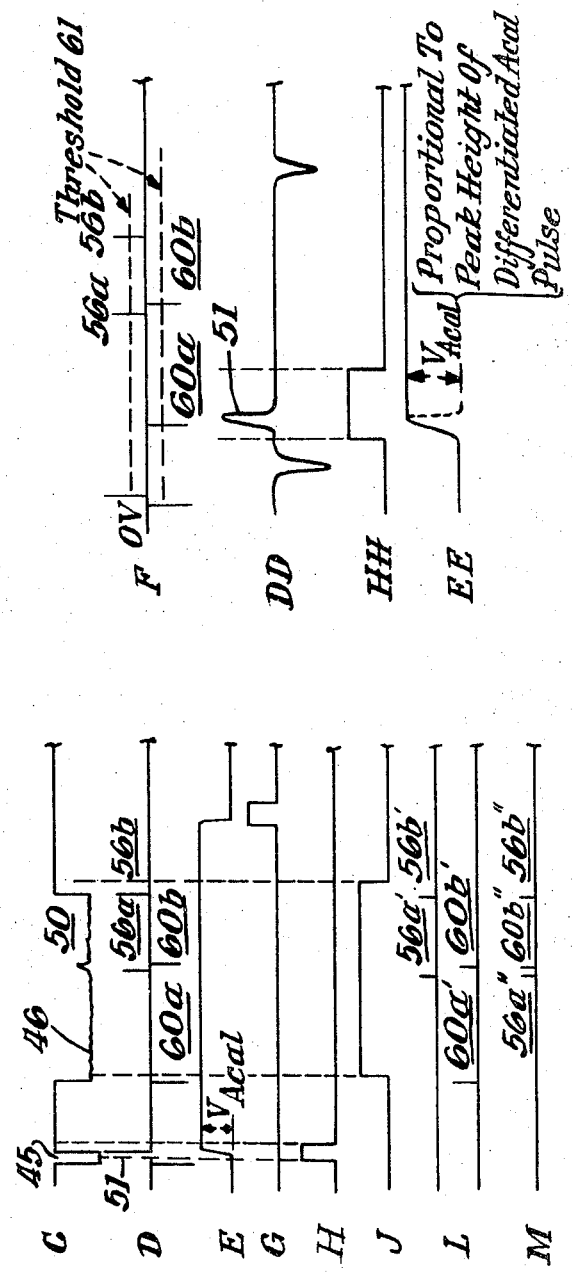
Fig. 5.

OPTICAL-ELECTRICAL WEB INSPECTION SYSTEM

BRIEF SUMMARY OF THE INVENTION

Generally, this invention relates to a flying spot inspection system for web materials comprising a radiation source, means traversing a beam of radiation from the source in a scan across the web, electronic means responsive to the beam of radiation in either the reflection mode or the transmission mode with respect to the web detecting the existence of three general classes of defects and discriminating said defects as to class, consisting of: (1) sharp edge defects, (2) diffuse edge defects and (3) protracted duration defects characterized by an amplitude-shifted pedestal of the optical-to-electrical transduction signal produced in the scan of the web, means responsive to the electronic means detecting the defects identifying web materials containing these defects and passing the remainder of the web materials as acceptable product, and automatic calibration means providing the electronic means with an instantaneous basic reference voltage signal determined by operation of the system with a preselected radiation attenuation filter replacing the web at the outset of the inspection scan.

DRAWINGS

Figure 1:
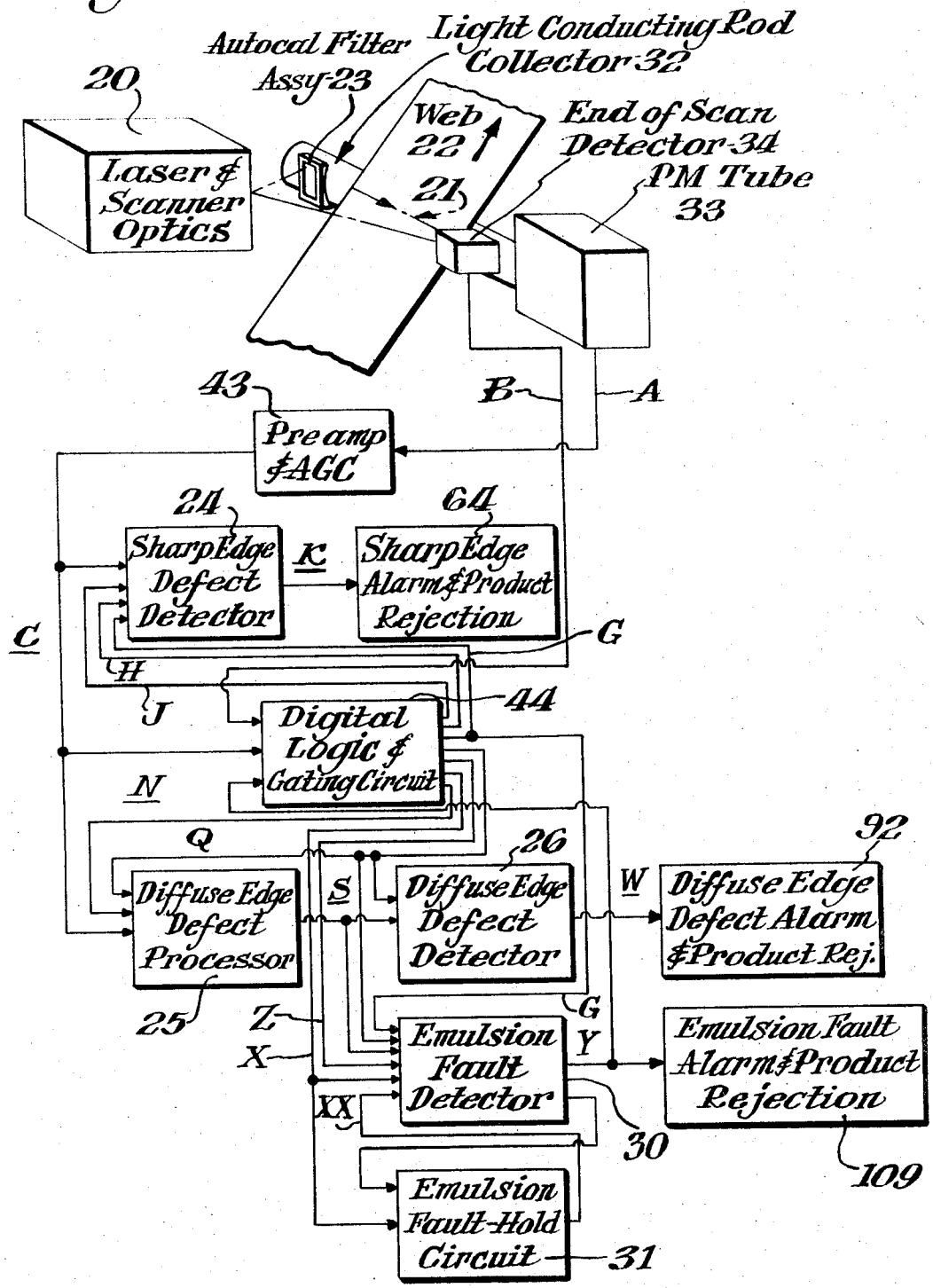
Figure 1B:
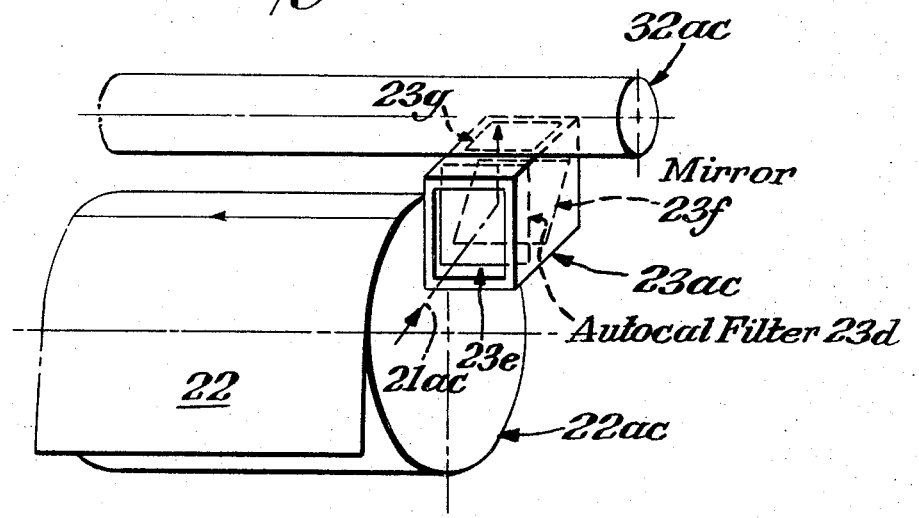
Figure 2:
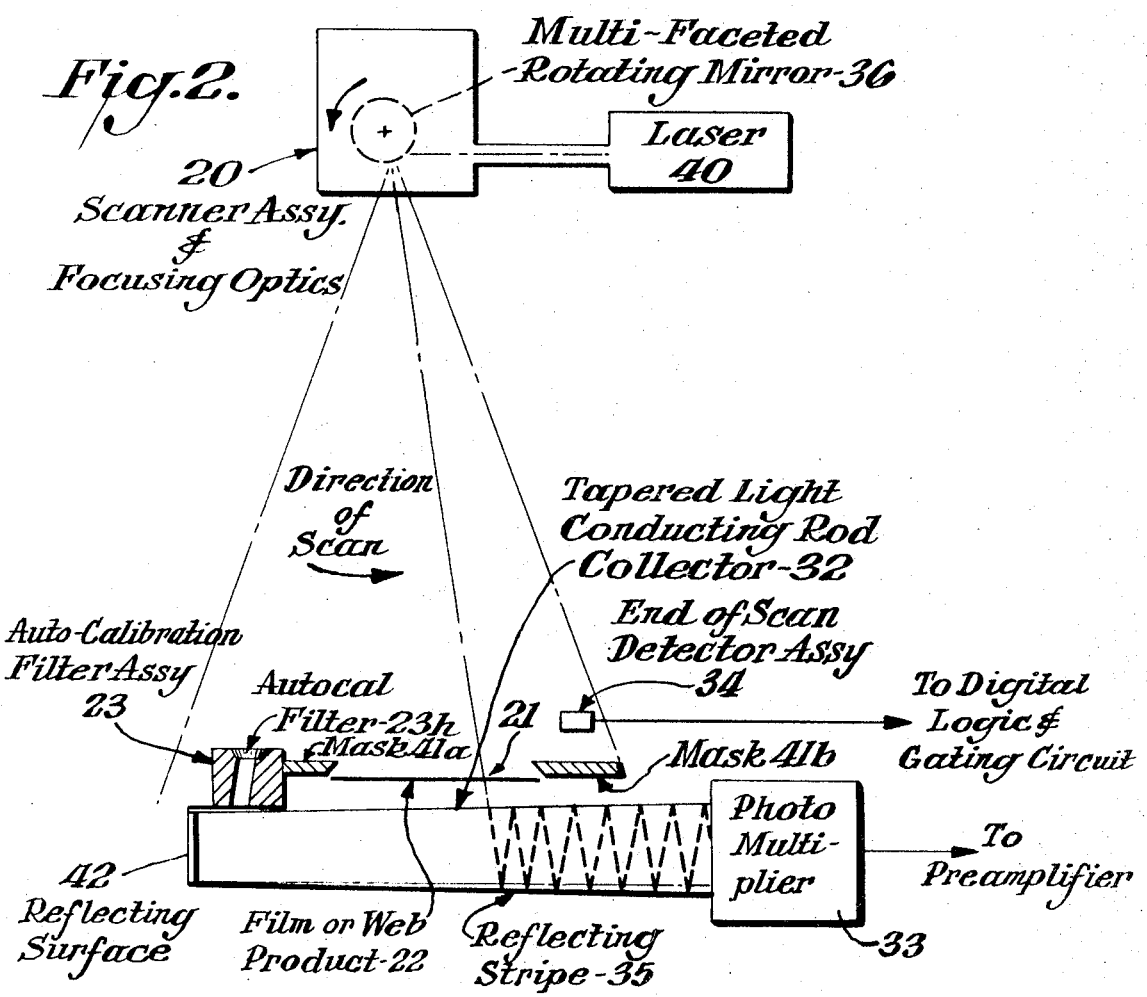
Figure 5A:
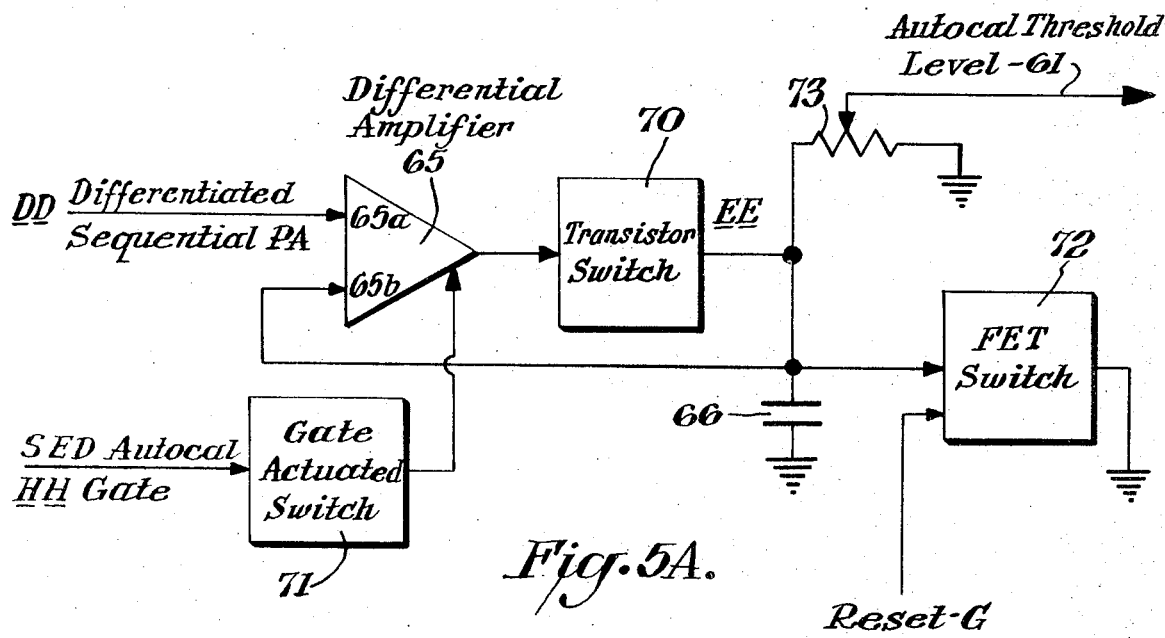
Figure 6:
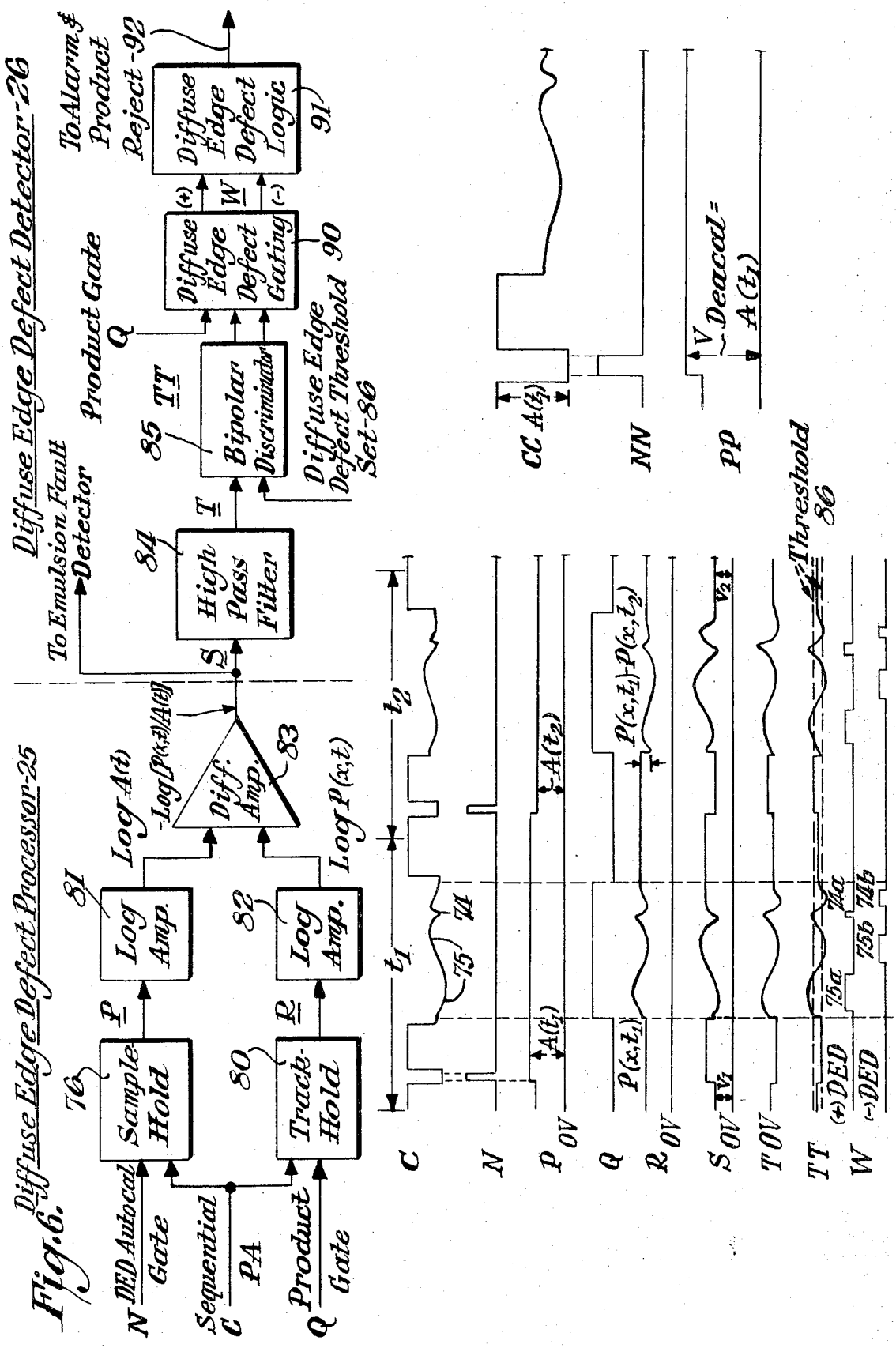
Figure 7:
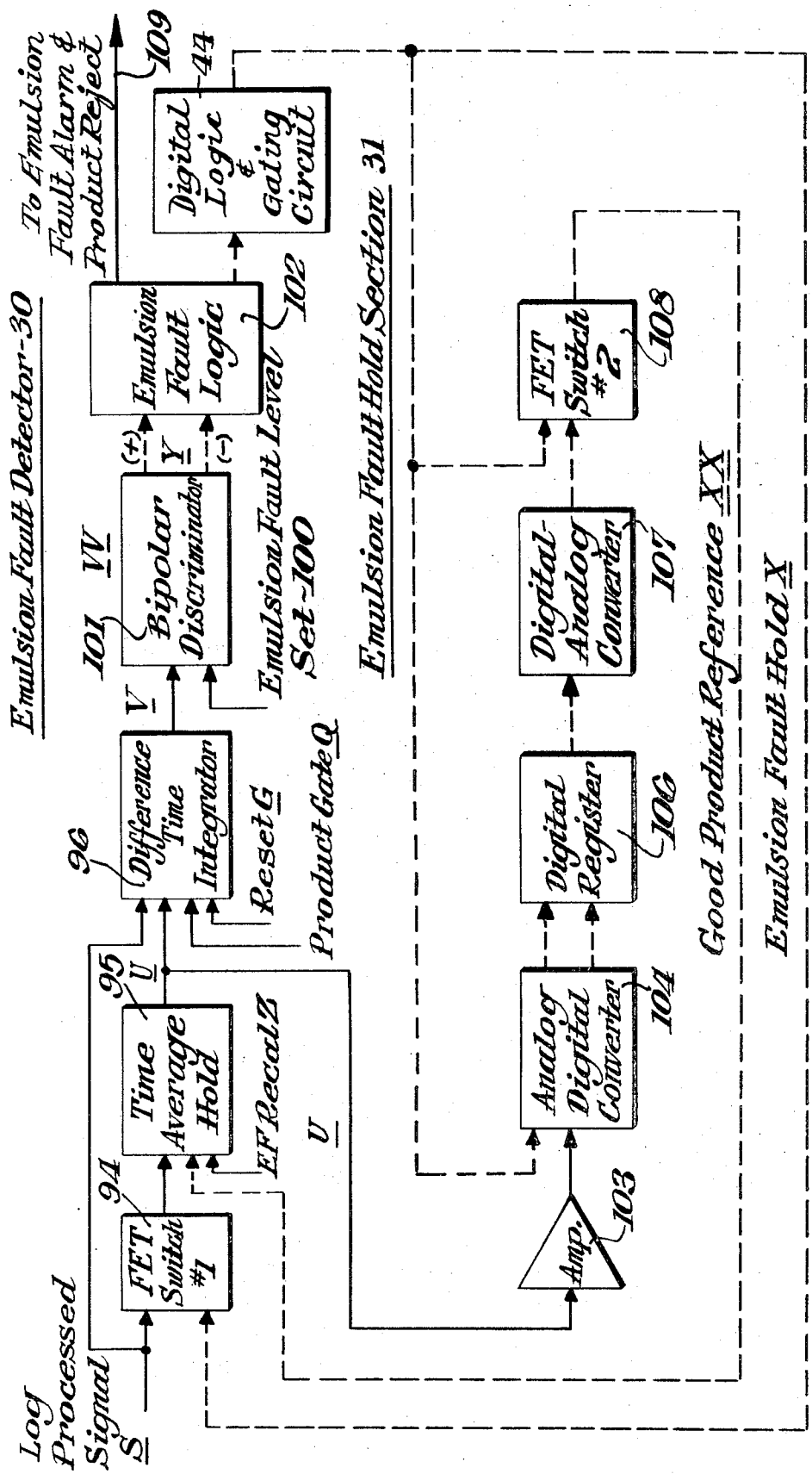
Figure 7A:
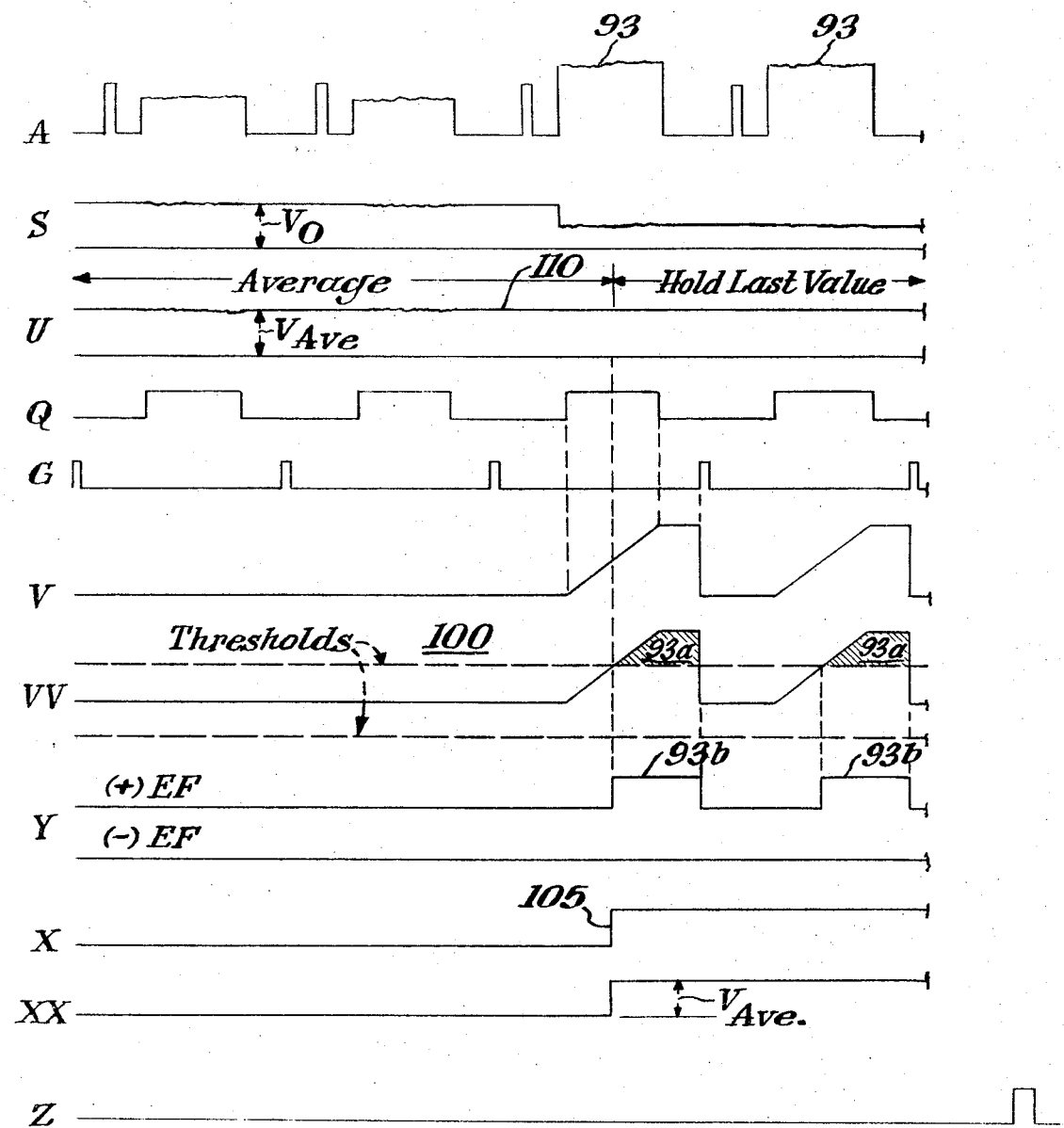

The following drawings constitute part of this specification, in which:

FIG. 1 is a block diagram of the entire inspection system,

FIG. 1A is a schematic side elevation view of the transmission and reflection channel inspection system employed for a preferred embodiment of apparatus utilized to inspect a running web of X-ray photographic film, FIG. 1B is a schematic view of the automatic calibration radiation filter sub-assembly used in a radiation reflection mode channel of FIG. 1A, FIG. 2 is a schematic plan view of the flying spot scanner, laser, automatic calibration (AUTOCAL) filter, and radiation-conducting rod collector sub-assembly for the radiation transmission control of FIG. 1A, FIG. 3 is a diagrammatic representation of the electrical signal waveforms existing in particular parts of the circuitry of FIG. 1 and succeeding FIGURES for both normal (acceptable) product on the left and faulty product on the right, FIG. 4 is a block diagram of the Digital Logic and Gating Section arrangement, FIG. 5 is a block diagram of a sharp edge defect (SED) detector and associated electrical signal waveforms, FIG. 5A is a block diagram of a preferred embodiment of an automatic calibration (AUTOCAL) peak detector, FIG. 6 is a block diagram of a diffuse edge defect (DED) detector and processor together with associated electrical signal waveforms, FIG. 7 is a block diagram of a protracted duration defect (PDD) detector corresponding with an emulsion fault (EF) or splice in the X-ray film example, with hold auxiliary, and FIG. 7A is a diagrammatic representation of electrical signal waveforms existing in particular parts of the circuitry denoted in FIG. 7.

BACKGROUND

The manufacture of high-quality continuous web products, such as X-ray film, unprinted fabrics, metal foils and the like, requires highly reliable inspection and, preferably, discrimination of defects as to their nature.

This invention constitutes an improved flying spot web scanning inspection system which can be used in either the radiation transmission or reflection mode to examine transparent or translucent webs, such as photographic film or polymeric wrapping materials, or light-opaque material such as aluminum foil, textile webs or the like where radiation transmission is capable of indicating holes or occlusions in the web, whereas radiation reflection indicates surface defects or conditions.

For purposes of this description, X-ray photographic film web is taken as the detailed example, because it must be fabricated to extremely high quality standards and the inspection preferably employed is in both the radiation transmission and reflection modes.

The variety of defects which can be detected and characterized are of three general classes in X-ray photographic film, which classes, however, are encountered in various counterparts in many other web products besides film, i.e., (1) sharp edge defects, which are most often small in size, including, for X-ray film: gel pox, base carbon, pinholes, coated dirt and the like, and, for textile webs: holes, jet tracks and fiber clumps, (2) diffuse edge defects, which are most often larger in size than sharp edge defects but have less distinct edges, including, for X-ray film: drying streaks, roll marks and disturbed coatings and, for textile webs: large clumps and changes in basis weight and (3) protracted duration defects which, typically, consist of full web width anomalies, such as splices, large area absences of coating, changes in web gage and the like.

The prior art has provided no method achieving high capability of defect detection over such a broad range of defect types on a scan-by-scan basis, especially where high precision is inhibited by both short-term and long-term variations in system parameters, such as illuminating source intensity, scanner mirror reflectivity, optical/electrical system gains and scanning spot intensity distribution. Consequently, there is need for frequent, preferably once during each scan, automatic system recalibration in order to ensure precise and consistent defect discrimination despite inspection system variabilities.

Previously, the most elementary photoelectric detector calibration (hereinafter referred to as Method No. 1) has been accomplished simply by means of establishing a predetermined or absolute discrimination level prior to product inspection, thereby providing a basis for defect definition during succeeding scans, but, of course, limited to constant system performance.

Method No. 2, as illustrated in U.S. Pat. No. 3,628,031, teaches standardization of the photomultiplier (PM) tube output level in accordance with its response during inspection of a selected region of the product known to be free of defects, whereupon said response then provides a threshold for determination of the presence or absence of defects during inspection of the product in manufacture.

Method No. 3, as illustrated in U.S. Pat. No. 3,061,731, uses a clamping circuit to hold constant, from scan to scan, the threshold established from the combined signal amplitudes from an auxiliary photodetector system and the main PM tube output during the period when scanning an adjacent surface of constant brightness and just prior to the product portion of the scan. Subsequent signal amplitudes in the product scan which exceed this threshold produce defect signals.

In order to obtain precise defect definition, Method No. 1 is not adequate, since none of the short- and long-term variations in system parameters is taken into account in the discrimination process. Method No. 2 depends upon product uniformity, not only over the length of the scan itself but also throughout the entire product run as well in order to ensure valid defect discrimination. Method No. 3 does not allow for product uniformity changes within acceptable limits, since the threshold levels are set by response to a surface chosen to correspond with normal product reflectance during the first few scans, whereby acceptable product changes might be discriminated as containing defects later in the run and, conversely, defective areas could be passed as acceptable should the gross sheet reflectance change.

There are yet other deficiencies in the prior art which this invention overcomes, all as hereinafter described with reference to a preferred embodiment.

THE INVENTION

In summary, this invention constitutes an analog/digital inspection system which includes means recalibrating automatically, scan-by-scan, sharp edge, diffuse edge and protracted duration fault detection circuits. These circuits receive informational signals from a single photodetector assembly (for each channel); however, calibration and defect detection and identification are accomplished by using two corresponding, yet distinct forms of the same calibration signal, such that each eliminates the adverse effects of both short- and long-term system parameter fluctuations in evaluating a particular class of defect.

Referring to FIGS. 1, 1A, 1B and 2 the flying spot scanner, denoted generally at 20, utilizes a laser source 40 directed at a multifaceted rotating mirror reflector 36 which, with associated beam-forming optics (not detailed), produces a highly collimated scanning radiation beam. This beam sweeps a spot of radiation 21 transversely across the running product web 22 at a high enough velocity to ensure that successive scans overlap sufficiently for complete product inspection.

During each scan, the beam passes over a radiation attenuation filter 23h which constitutes the automatic calibration means, referred to hereinafter as the "AUTOCAL filter", immediately prior to the web scan. This produces the calibration signal which is routed to the analog sharp edge defect detector 24 and the diffuse edge defect processor 25. The emulsion fault detector 30 (which latter is the X-ray film inspection system counterpart of the protracted duration defect class detector recited broadly in the claims) is calibrated indirectly with reference to the AUTOCAL calibration signal, as hereinafter described.

A radiation-conducting rod collector 32 conveys the energy from the beam which is transmitted through AUTOCAL filter 23h plus that which is reflected from, or transmitted through, the running product web 22 to a photomultiplier (PM) receiver 33. Referring to FIGS. 3 and 5, a time sequential electrical signal A is thereby generated for each scan, in which there appears in sequence from left to right an AUTOCAL pulse 45 followed by a product pedestal signal 46. The AUTOCAL component 45 of this signal is used in the circuitry to establish basic reference voltage signals and sensitivity levels in the several defect detection circuits for analysis of the succeeding product pedestal portion of each scan waveform.

Referring to FIG. 1A, there is shown a three-channel inspection system wherein the upper beam 21a and lower beam 21c each scan the running web 22 being inspected in the reflection mode, whereas middle beam 21b scans the web in the transmission mode. Multichannel inspection is particularly preferred for high quality standard products, such as X-ray photographic film, since surface defects are usually detected more readily by analysis of the reflected radiation, whereas internal defects are more reliably detected by analysis of the transmitted radiation.

In this instance, the film is drawn through the inspection system over large rolls 22a and 22c and is steadied in its transit by idler rolls 22b and 22d. Large rolls 22a and 22c in the reflection inspection channels are covered with non-reflective non-abrasive material which substantially eliminates back-scattered radiation from the underlying roll surfaces. It will be noted that those web transport rolls are positioned with respect to one another so that reflection mode inspection of one side of web 22 is accomplished by the lowermost channel, whereas reflection mode inspection of the reverse side of the web is accomplished by the uppermost channel. Intermediate idler rolls 22b orient web 22 to run vertically through the horizontal transmission mode scanning beam path 21b.

It will be understood that each channel of FIG. 1A is a self-contained inspection system having, in the case of the upper channel, its own laser scanner assembly 20a, AUTOCAL filter assembly 23a and radiation-conducting rod collector 32a arranged in the relative order recited, omitting for simplicity in the showing, however, the exact locations of the components with respect to one another.

Similarly, the middle transmission channel comprises laser scanner 20b, AUTOCAL filter assembly 23b and radiation-conducting rod collector 32b, whereas the lower channel (reflection) comprises laser-scanner 20c, AUTOCAL filter assembly 23c, and radiation-conducting rod collector 32c.

The actual construction of an AUTOCAL filter assembly 23ac for a reflection mode channel is detailed in FIG. 1B wherein the radiation attenuation filter 23d per se is shown as supported vertically within a radiationopaque cup 23e having its open end directed towards the associated laser scanner assembly so as to receive the scanning beam 21ac. Mirror 23f, located past filter 23d, reflects the attenuated radiation upwardly through a port 23g and thence into radiation-conducting rod collector 32ac. Mirror 23f is disposed so that a perpendicular drawn to its surface is coparallel with a perpendicular drawn to the adjacent inspected surface of web 22, so that the reflected energies of the AUTOCAL and web scans will enter radiation-conducting rod collector 32ac generally along the same longitudinal line. Thus, in its lateral sweep, the scanning beam first impinges on the AUTOCAL filter and thence proceeds leftward as indicated by the arrow drawn across the width of web 22 to complete the scanning traverse while the web is advanced upwardly beneath rod collector 32ac and over large roll 22ac.

The axial orientations of the radiation-conducting rod collectors with respect to the transmitted and reflected radiation beams are shown by the positions of the reflecting stripes 35a, 35b and 35c, respectively.

Referring to FIG. 2, the essential components of a transmission mode channel are shown in actual relative arrangement. Here, AUTOCAL filter assembly 23 containing attenuation filter 23h is shown on the extreme left, where it is first traversed during any given scan. The edges of web 22 being inspected are surmounted by radiation-opaque masks 41a and 41b which prevent introduction of diffusely-scattered radiation from the product edges into the radiation collection system and also ensure that no direct high intensity radiation impinges on the PM receiver 33. Extraneous radiation is objectionable, because it produces localized amplitude distortion in the pedestal signal end points with consequent deterioration in the defect discrimination capability of the inspection system.

An end-of-scan detector 34, typically a silicon solar cell sensor, is a preferred means establishing preselected time durations in the digital section of the system hereinafter described and also indicates the relative intensity of the scanning beam 21.

FIG. 2 also shows the principal components of the flying spot scanner 20, including a multifaceted rotating mirror 36 and its associated laser 40. For the inspection of X-ray film, scan rates, spot size, wavelength and energy content of the laser beam must be selected carefully, such that the inspection beam is nonactinic. For the red radiation from a 5mW He-Ne laser, a scan rate of 2,400 scans/sec., or one scan per 417$\mu$ sec., with a spot size of less than 1-mm. diameter is acceptable. In addition, it is practicable to introduce a variety of appropriate lens systems into the laser-product beam path to vary the spot dimensions, depending upon the type of product being inspected. Flying-spot scanning techniques are well known in the art, e.g., U.S. Pat. No. 3,574,469.

The use of radiation-conducting rod collector systems of a variety of sizes and shapes to conduct energy to photoelectric transducers is well known in the art. Specific examples are taught in U.S. Pat. Nos. 3,331,963 and 3,728,548.

When inspecting wide product webs for small defects, the use of rod collectors is particularly advantageous, because the use of large mirror systems such as taught in U.S. Pat. No. 3,574,469 is thereby obviated. The latter systems, utilizing multiple radiation reflectors, are disadvantageous because they detract from the signal-noise ratio.

According to this invention a frusto conical 3.96 meter long acrylic polymer rod 32 of progressively enlarged cross-section (from 34.9 mm. to 76.2 mm. diameter, typically) in the direction of the photoelectric transducer, i.e., PM tube 33, provides a flat or even pedestal and acceptable transmission loss when it is used in conjunction with a reflecting end surface 42 and a tapered reflecting stripe 35 having a mean width of 6.3 mm.

Initial adjustment in the position of PM tube 33, or the reflecting end surface 42, or both, produces the necessary flat signal pedestal, whereas the simple painted tapered reflecting stripe 35 along the back side of radiation-conducting rod collector 32 corrects for any additional pedestal unevenness introduced by product consistency changes. It is essential to the discrimination processes used in both the diffuse edge defect and emulsion fault detection circuits that signal pedestal flatness be maintained.

In multi-channel inspection systems of the type shown in FIG. 1A, it is not necessary to produce sequential signals having identical spacings between their AUTOCAL and pedestal components. Therefore, positioning of the AUTOCAL filter assemblies 23a, 23b and 23c with respect to product web 22 and associated radiation-conducting rod collectors 32a, 32b and 32c, respectively, is not critical, provided, however, that the scan across the AUTOCAL filter 23h precedes that across the product 22.

The AUTOCAL filter 23h can be fabricated from a wide variety of materials so long as it possesses long-term stability and reproducibility from channel to channel and from machine to machine. This filter should also have an invariant attenuation characteristic with respect to the scanning radiation wavelength and also give an AUTOCAL signal 45 (FIG. 3) having an amplitude approximating the normal product pedestal height 46. Both Corning glass and Eastman Kodak gelatin type neutral density optical filters have been used with good results; however, glass is preferred because of its inherent time invariant optical characteristics.

Neutral density filters are used widely in photography and are well-adapted for use as AUTOCAL references because of their ready availability in a wide range of different attenuation values meeting specific product reflectivity and transmissivity requirements, and because they possess essentially invariant wide bandwidth radiation attenuation characteristics.

As shown in FIG. 1, a suitable preamplifier and automatic gain control stage 43 is interposed between PM tube 33 and the defect detection circuits. This stage boosts the signal amplitude and isolates photomultiplier 33 from possible loading effects of the succeeding inspector stages, whereas the automatic gain control ensures that the output signal amplitude C remains within preselected limits in order that changes in laser intensity or PM tube efficiency do not degrade the system performance.

Referring to FIGS. 1 and 4, digital logic and gating circuit 44 incorporates a counter section 44a, a decoder section 44b and a logic section 44c, and generates all of the timing gates for the analog section hereinafter described. In addition, a circuit (not shown) within 44 conditions the defect signals so that a computer can be thereby controlled to activate alarms, initiate the marking, slitting and chopping operations necessary to separate defective product from acceptable product at a convenient point in the finishing process, and to perform a data analysis on the defects detected.

FIG. 4 recites the essential inputs to and outputs from circuit 44, which are denoted by alphabetic letters to correspond with the waveforms shown in FIG. 3. Thus, the inpts consist of the time sequential preamplifier signal C, emulsion fault Y, scan detect B and high frequency stable clock signals effecting time coordination for the entire inspection system. The scan detect signal B initiates the reset pulse G, whereas the combination of an AUTOCAL pulse 45 leading edge, clock pulses, a counter and appropriate decoders set and reset flip flops to generate the sharp edge defect AUTOCAL gate H and the diffuse edge defect AUTOCAL gate N. The inspection gate J and product gate Q are formed similarly, except that the product pedestal 46 leading edge is used in place of AUTOCAL signal 45 to initiate formation of these gates. The emulsion fault hold signal X is initiated at the instant that an emulsion fault Y is detected, or, if desired, when a diffuse edge defect occurs (not shown). To recalibrate the emulsion fault circuitry at the beginning of a new product run, the operator manually initiates an emulsion fault recalibrate signal Z. The gates which are formed as described have extremely precise widths, which are required to pass selected portions of the AUTOCAL pulse and pedestal portion 46 of the high repetition rate sequential preamplifier signal C. In this connection, each scan requires that the diffuse edge defect AUTOCAL gate N fall precisely within the bounds of AUTOCAL pulse 45, which may be as narrow as 1–2$\mu$ sec.

Referring to FIG. 5, there is detailed the sharp edge defect detection circuit 24 which detects flaws having sharp edges or those which can be defined within the boundary of the scanning spot. A typical sharp edge defect is shown as peaked signal 50 in the pedestal 46 of electrical signal waveform C. The amplitude of this pedestal signal 46, expressed as $f(x, t)$, is a function of a number of parameters, as shown by the following equation, where:

$f(x,t) = K(s,t)P(x,t)$ where $K(s,t) = [I_o(t)R_f(t)G_o(t)G_e(t)/\theta(s,t)]$ where $x =$ the distance across the web
$t =$ time
$s =$ width of the scanning spot, and
$P(x,t)$ is the product characteristic
$I_o(t)$ is the radiation source intensity
$R_f(t)$ is the scanning mirror reflectivity
$G_o(t)$ is the optical system gain
$G_e(t)$ is the electrical system gain
$\theta(s,t)$ is the irradiance distribution of the flying radiation spot across its width.

Examples of causes for variations in light source intensity, $I_o(t)$, include: power supply changes, and aging of laser optics and components. Scanning mirror reflectivity differences, $R_f(t)$, originate in the unevenness of the surfaces between mirror facets as well as in the uneven collection of dust and haze on these surfaces. Optical system gain variations, $G_o(t)$, originate in PM tube aging, dust on the radiation-conducting rod collectors or on the entrance and exit ports of the scanner assembly, whereas electrical system gain variations, $G_e(t)$, originate in changing electronic component characteristics in the preamplifier and detector stages. The irradiance distribution of the flying spot, $\theta(s,t)$, is not constant across its width and changes very slightly with scan position, i.e., with the beam's angular relation to the web surface. This is a particularly important consideration in sharp edge (or small) defect detection, and thus the optical system design allows for a long beam length compared to product width to minimize the effects of $\theta(s,t)$.

Since sudden changes in the transmitted or reflected radiation produce signals having steep sides, which correspond to defects having sharp edges, the discrimination of the differentiated signal is the preferred method used to detect the sharp edge fault class. It will be understood that a narrow scanning beam having a small $\theta(s,t)$ will be able to define the small defect producing a strong sharp edge defect signal, whereas a larger scanning spot having a larger $\theta(s,t)$ will produce a weaker response from the same defect.

Accordingly, the sharp edge defect detector 24 circuit differentiates the sequential signal C with respect to distance across the web, producing waveform D, which represents $[df(x,t)/dx] = K(s,t) [dP(x,t)/dx]$ where P is again the product characteristic.

After differentiation and amplification of waveform C by the differentiator 53 and the amplifier 54 components, the sharp edge defect AUTOCAL gating circuit 55 operates to permit sharp edge defect AUTOCAL gate H, generated by the digital logic and gating circuit 44, to sample the height of differentiated AUTOCAL pulse trailing edge 51 in waveform D. This value establishes the height $V_{ACAL}$ of step function E, which terminates on the occurrence of the end-of-scan reset pulse G. The bipolar discriminator 52 uses the scaled value $V_{ACAL}$ of step function E to establish thresholds 61 in waveform F for the detection of both negative, 56a, 56b, and positive, 60a, 60b, polarity spikes D generated from the differentiation of waveform C wherein the scaled $V_{ACAL}$ adjusts the amplitude of the AUTOCAL-regulated threshold 61 to meet particular product specifications.

In this invention, positive polarity defect signals relate to those defects producing signals which tend to increase pedestal 46 height, and, conversely, negative polarity defect signal relate to those defects producing signals which tend to decrease pedestal height.

Bipolar discriminator 52 can conveniently comprise two voltage comparators, e.g., National Semi-Conductor Corp. Model LM211D, connected so that each produces a constant unipolar digital output signal whenever, and as long as, its particular positive or negative threshold value is exceeded by the input analog signal.

Referring to waveform L, FIG. 5, it will be seen that pulses 56a', 56b', 60a', 60b' correspond, respectively, to each spike which exceeds the scaled AUTOCAL established threshold level 61 in waveform F. Since both AUTOCAL 45 and pedestal 46 components of sequential signal C are differentiated and amplified by the same means, the system proportionality factor $K(s,t)$ associated with these AUTOCAL, $f_{ACAL}(x,t)$, and pedestal, $f_{PED}(x,t)$, signal components remains unchanged and will cancel in the discrimination process. This can be seen in the following relations which define the operation of bipolar discriminator 52: $|df_{PED}(x,t)/dx| - |df_{ACAL}(x,t)/dx| \geq 0$ where $f_{PED}(x,t) = K(s,t)P_{PED}(x,t)$
$f_{ACAL}(x,t) = K(s,t)P_{ACAL}(x,t)$ and $P_{PED}(x,t)$ is the product characteristic
$P_{ACAL}(x,t)$ is the AUTOCAL filter characteristic Since $K(s,t)$ never becomes zero, this expression will go to zero only when $abs(dP_{PED}(x,t)/dx)$ and $abs(dP_{ACAL}(x,t)/dx)$ equal one another. At this time bipolar discriminator 52 initiates a digital output signal which is independent of $K(s,t)$. As long as the "defect present" condition prevails, the inequality $abs\ (dP_{PED}(x,t)/dx) > abs(dP_{ACAL}(x,t)/dx)$ maintains the digital output signal amplitude invariant regardless of changes in $K(s,t)$.

Consequently, short- or long-term system variations have essentially no effect on the detection of sharp edge defects. In addition, since only differentiated wave-forms are used, the flatness requirement as regards the product pedestal is not essential.

Reference to the enlarged waveforms DD, HH and EE of FIG. 5 shows more clearly the development of AUTOCAL step function EE (corresponding to waveform E). Differentiation of AUTOCAL signal 45 contained in signal waveform C produces leading and trailing edge sharp pulses, as to which the trailing edge pulse 51 amplitude is, in effect, sampled during the sharp edge defect AUTOCAL gate signal HH. The trailing edge signal is selected since the leading edge signal occurs too early to be gated (it is this latter edge which initiates the formation of the sharp edge defect AUTOCAL gate HH in the digital logic and gating circuit 44). The held sampled differentiated trailing edge value produces the step function EE of height $V_{ACAL}$, thereby establishing the scaled absolute discriminator threshold value 61 shown in waveform F.

Referring to FIG. 5, a sharp edge defect gating circuit 62 employs inspection gate J to ensure that only the detected sharp edge defect signals, except those appearing in the very narrow strip (about 2.5 mm. wide) along the product leading edge plus the product trailing edge pulse, are recorded by the sharp edge defect count logic 63. This results in waveform M carrying pulses $56a''$, $56b''$ and $60b''$. The leading edge of pedestal 46 is not gated, as this would produce a signal which would be registered as a defect, since the logic is designed to accept the trailing edge signal to produce a count of one, thereby indicating a normal product, a count of two or more indicating a faulty product, and a zero count indicating a splice, or no product. The occurrence of small defect and splice signals actuates appropriate alarms or signals as well as product marking and rejection, where called for, as indicated generally at 64, FIG. 1.

FIG. 5A shows a preferred embodiment of the sharp edge defect AUTOCAL gating circuit 55. A high-gain differential amplifier 65, comparing the voltage across capacitor 66 with the differentiated input signal DD, is turned on by the gate-actuated switch 71 during the presence of sharp edge defect AUTOCAL gate HH. It will be recalled (refer FIG. 5) that the sharp edge defect AUTOCAL gate HH overlaps the trailing edge spike 51 of the differentiated AUTOCAL pulse 45.

Transistor switch 70 turns on whenever the potential difference between terminals 65a and 65b of differential amplifier 65 is $V_{65a}-V_{65b} > 0$, and turns off when $V_{65a}-V_{65b} \leq 0$. Since the voltage across capacitor 66 is initially less than, or equal to, the value of DD, transistor switch 70 turns on and permits the voltage across capacitor 66 to follow the spike buildup. At the instant that the peak value is reached, and the trailing edge of this spike begins to appear at the input terminal 65a, the value of the potential difference $V_{65a}-V_{65b}$ passes through zero, whereupon transistor switch 70 opens and the voltage across capacitor 66 is held.

In this manner, the voltage across capacitor 66 follows the differentiated AUTOCAL trailing edge signal spike 51 until its peak value is reached. The end of the sharp edge defect AUTOCAL gate HH turns off the gateactuated switch 71, which, in turn, disables differential amplifier 65 so that succeeding differentiated pulses encountered during a given scan are ignored.

At the end of the scan, reset pulse G closes the field effect transistor switch 72 to ground, thereby discharging capacitor 66 to ground level in preparation for the next scan. Potentiometer 73 is used to preselect the scale for amplitude $V_{ACAL}$ of the AUTOCAL step function EE to serve as product quality threshold level 61 in the succeeding bipolar discrimination circuit 52. Product quality potentiometer 73 should be selected to possess a sufficient value to prevent significant leakage of charge from capacitor 66 to ground during a scan. To provide additional isolation, a unity gain buffer amplifier (not shown) can be inserted in the line adjacent product quality potentiometer 73.

In service, the inspector operator manually sets the product quality threshold to the prescribed value, which has been based on previous results of extensive statistical sampling of the specific product to be inspected.

In contrast with the sharp edge defects detected and discriminated as hereinbefore described, defects with diffuse edge characteristics, such as blotches or streaks, cannot be detected in this manner. Yet another type of defect particularly difficult to detect, and not ascertainable by differentiating the product pedestal, is the protracted duration defect, one example of which, for photo film product, the uneven emulsion condition characterized by: (1) a slanted product pedestal or (2) a slow change in pedestal height from scan to scan. The detection of protracted duration faults will be hereinafter described with reference to the emulsion fault circuits. In any case, the consistent detection of any of the three general classes of defects requires that particular attention be given to the short-term and long-term inspection system variations hereinbefore described.

FIG. 6 shows a preferred embodiment of diffuse edge defect processor 25 and detector 26 circuits which provide the compensation needed to perform consistent and valid discrimination of diffuse edge defects not falling under the emulsion fault class. The function of the diffuse edge defect processor 25 is to effect this compensation and thereafter enable the adjoining diffuse edge defect detector 26 to discriminate this type of defect as a percentage of product signal level. The operation of these two circuits is described with reference to characteristic electrical signal waveforms depicted.

The sequential preamplified input signal C, FIG. 6, shows a sharp edge defect 74 superimposed on a larger undulating type product defect 75, which appears over two successive scan periods $t_1$ and $t_2$. The second scan period signal, labeled $t_2$, shows amplitude-reduced AUTOCAL and pedestal components due to a change in incident illumination typically caused, for example, by a difference in the reflectivity of the adjacent facets of the scanner rotating mirror.

The amplitude of the AUTOCAL pulse 45, $A(t_1)$, is sampled during the AUTOCAL gate N interval and is then held to produce the diffuse edge defect AUTOCAL reference P. Waveforms CC, NN and PP, corresponding to waveforms C, N and P, respectively, are enlarged views of the diffuse edge defect AUTOCAL signal formation. The AUTOCAL sample-hold circuit 76 maintains this reference, $A(t_1)$, until replaced by the next sample, $A(t_2)$. Simultaneously, a track-hold circuit 80 follows the variations of the product pedestal, P($x,t_1$), passed through the action of the product gate Q, and holds the final product value P($x,t_1$) until the occurrence of the next product gate signal Q, thereby producting P($x,t_2$) shown in waveform R. For the situation illustrated, both the diffuse edge defect AUTOCAL P and product pedestal amplitudes R decrease as a result of the reduction in scan illumination.

Using the conventional technique of differencing the logarithms of two factors to produce the logarithm of their ratio, the diffuse edge defect AUTOCAL P and product pedestal R signals are logarithmically processed by log amplifiers 81 and 82, respectively, and their differences taken by the difference amplifier 83 to produce the logarithmic ratio, (−) Log [P($x,t$)/A($t$)], represented by signal waveform S.

Since both P($x,t$) and A($t$) signals are influenced by the same system proportionality factor K($s,t$), this factor cancels out when the ratio is taken, and waveform S consequently contains calibrated defect information. Accordingly, defect amplitudes can be defined in terms of percentages of the product signal, not product plus noise signal level.

To effect this result, however, it is necessary to preselect the diffuse edge AUTOCAL signal P level by appropriate selection of the AUTOCAL radiation attenuation filter 23$h$ material to provide the appropriate gain that will either more, or less, accentuate the defects as a percentage of the product pedestal signal height. (Waveform S illustrates the case where the defects have been accentuated.)

Any difference between signal levels $V_1$ and $V_2$ in the log-processed ratio signal waveform S during any two successive scan periods indicates the exitence of an emulsion fault or splice condition identified by a change in pedestal level without a corresponding change in the AUTOCAL pulse height. This particular class of diffuse edge defect will be detected in the emulsion fault detector hereinafter described.

From the foregoing, it will be understood that any initial unevenness in the pedestal portion of sequential signal C with the product not present (as seen in the transmission mode) will contribute towards distortion of the diffuse edge defect signals at one or more regions in the scan when the product is present. Consequently, proper adjustment of the elements of the radiation-conducting rod collector system 32, 35, 33 and 42, FIG. 2, to produce a flat pedestal is imperative.

After passing through a high-pass filter 84, which removes the d-c component of the input signal S, waveform T is produced which enters the bipolar discriminator 85 where diffuse edge defect detection is accomplished. Those portions of the signal T which exceed the preselected thresholds 86 in waveform TT and which fall within the product gate Q interval in the diffuse edge defect gating circuit 90 are classed as positive, 74$a$, 75$a$, or negative, 74$b$, 75$b$, diffuse edge defects. It will be seen that the pulse durations are indications of respective defect sizes. These signals are sent on to the diffuse edge defect logic circuitry 91 of the detector which, in turn, initiates appropriate alarms or signals and product rejection action 92.

Although not shown, the diffuse edge defect signal can be used to initiate the emulsion fault hold signal X to improve the sensitivity of the emulsion fault detector 30, described next.

As hereinbefore mentioned, emulsion faults (which are an example of the general protracted duration defect class discriminated by this invention) are difficult to detect. FIG. 7, taken together with the applicable signal waveforms depicted in FIG. 7A, shows a preferred embodiment of emulsion fault detector 30 for the discrimination of this type of fault.

Referring to FIG. 7A, signal waveform A represents a succession of four scans in a transmission channel in which an emulsion fault 93, in this instance an emulsion miss, occurs in the last two scans. This fault is immediately recognizable, since the pedestal height suddenly rises above the AUTOCAL pulse 45 height. (Conversely, a comparatively low pedestal signal would also represent a heavy emulsion or splice.) However, neither the sharp edge defect detector nor the diffuse edge defect detector hereinbefore described will identify this waveform as defective, since differentiating the pedestal 93 produces no sharp edge defect-related signal, and sending the log processed waveform S through a high pass filter 84 produces no corresponding a-c signal representative of diffuse edge defects.

The emulsion fault detector 30 functions to compare the instant log-processed and calibrated signal S with its time-averaged value U over many scans, such that the resulting time-integrated difference is used to detect a fault. For particularly refined time-averaged values, as mentioned previously, means (not shown) can be used to initiate the emulsion fault hold signal X upon the occurrence of diffuse edge defect signals W (FIG. 6). This ensures that essentially only good product is used to form a good product comparison standard.

Referring to FIGS. 7 and 7A, the log processed ratio signal S received from hereinbefore described diffuse edge defect processor 25 has an initial amplitude $V_o$ and passes through a field effect transistor (FET) switch No. 1, 94, normally closed, to a time-average-hold circuit 95. The output of this circuit is the time-averaged value of S over many web scans, denoted by waveform U having an amplitude $V_{AVE}$ approximately equal to $V_o$.

The difference between the amplitudes of the two signals S and U is time-integrated by the difference time integrator circuit 96 during the period that it is activated by product gate Q. At the end of each product scan, reset pulse G switches the integrator circuit 96 to return its output to the base line level, thereby dumping the accumulated value to produce the output waveform V. When signal V exceeds the preset thresholds 100 in waveform VV in the bipolar discriminator 101, as indicated by 93$a$, a corresponding positive fault signal 93$b$ is produced in waveform Y. Negative polarity fault signals produce corresponding negative counterparts in waveform Y and, for both polarities, the durations correspond to the severity of the faults. The emulsion fault logic section 102 receives the emulsion fault signal Y and, in response, produces the appropriate alarm and product rejection output 109, as hereinbefore described for the sharp edge and diffuse edge defect classes, and also causes the digital logic and gating circuit 44$c$ to produce an emulsion fault hold signal X.

Signal X produces several results, namely: (1) it opens FET switch No. 1, 94, and (2) it causes the time-average-hold circuit 95 to stop averaging the log processed signal ratio S and substitute in its place a "good product" reference signal XX with amplitude $V_{AVE}$ produced by the emulsion fault hold circuit 31. Several scans after the emulsion fault condition has cleared, the digital logic and gating circuit 44 will cause the emulsion fault hold signal X to return to its base line value, thereby closing FET switch No. 1, 94, and restoring the operation of the time-average hold circuit 95.

Maintenance of a long-term stability of the "good product" signal amplitude XX is imperative, as this level represents, to the inspector, the best information available within a product run of good product quality. Since short- and long-term variations have already been taken into account, signal XX constitutes an absolute comparison standard for good product transmissivity or reflectivity, as the case may be.

Additionally, the emulsion fault hold signal X activates the emulsion fault hold circuit 31, which operates in the following manner.

The time-averaged signal U received from emulsion fault detector section 30, is amplified by amplifier 103 and is then sampled by the analog-digital converter 104 at the instant the leading edge 105 of the emulsion fault hold step function X passes. This sampled signal amplitude is converted into digital form by analog-digital converter 104, which enables and loads the digital register 106. As long as the emulsion fault hold signal X prevails, digital register 106 will maintain its loaded value invariant, regardless of succeeding signal variations seen at the input of the analog-digital converter 104. A digital-analog converter 107 converts the digital register output signal back to analog form which, after passing through FET switch No. 2, 108, now becomes the "good product" reference signal input XX, $V_{AVE}$, supplied to the emulsion fault detection section 30. Waveform XX shows that, until the occurrence of the emulsion fault hold signal X, the "good product" reference is at ground state, but then jumps to a value $V_{AVE}$ matching the last known time-averaged signal amplitude 110 prior to the detection of an emulsion fault condition 93.

The FET switch No. 2, 108, which closes at the occurrence of the emulsion fault hold signal X, causes the substitution of the "good product" reference XX for the time-averaged log processed ratio signal S in the time-average-hold circuit 95. The output of circuit 95 now becomes the fixed amplitude-level "good product" reference XX having a value equal to the time-averaged signal U amplitude 110 at the exact instant that the emulsion fault hold signal X leading edge 105 passes.

Referring to FIGS. 1 and 3 particularly, the operation of the complete inspection system in detecting typical faults is summarized as follows.

The waveforms in the left-hand column of FIG. 3 represent signals resulting from laser beam scans over a normal acceptable product, whereas those in the right-hand column depict results of scans across a faulty product in which appear sharp edge (small) 111, diffuse edge (large) 112, and emulsion fault 113 type defects. Each waveform is alphabetically identified to correspond with the signals existing in matching regions of FIG. 1. A laser-optical system 20 is used to produce a flying spot scan 21 across an optical AUTOCAL filter assembly 23 provided with a filter of specified radiation attenuation characteristics and thence across a product web 22 moving in the direction indicated. The PM tube 33 produces a sequential waveform A from the energy transmitted through the product and conveyed to it by the radiation-conducting rod collector 32. (FIGS. 1A and 1B depict an arrangement for the collection of reflected energy.)

An independent solar cell end-of-scan detector 34 produces a signal B which is a measure of the inspection beam power and initiates formation of reset pulse G produced by the digital logic and gating circuit 44. The difference in height between the two end-of-scan pulses 114, 114a in the left-hand waveform confirms a change in incident illumination also causing the indicated increased amplitude in both AUTOCAL 45a and pedestal 46a portions of the sequential signal A shown immediately above.

Operation of the preamplifier and AGC circuit 43 produces an inverted, but amplified, sequential waveform C which contains the AUTOCAL component 45 and the pedestal component 46 information necessary for discriminating the wide variety of defects hereinbefore described in the succeeding sharp edge defect, diffuse edge defect and emulsion fault (protracted duration defect) stages. The digital logic and gating circuit 44 produces a sharp edge defect AUTOCAL gate H which is timed to permit just the differentiated AUTOCAL pulse 45 trailing edge to pass. Using the amplitude of this pulse as a reference, the differentiated sequential signal C is first discriminated and then gated by inspection gate J to produce positive and negative sharp edge defect signals K which actuate appropriate alarms 64 and effect product rejection. Since inspection gate J passes the pedestal trailing edge negative pulse 115, a count of one indicates a normal product. Therefore, the presence of one negative defect spike 115 in the left-hand waveform K denotes a normal product, whereas the two negative 115, 111a and one positive 111b defect spikes in the right-hand waveform K show the presence of at least one sharp edge defect. (In this connection, the existence of individual sharp edge defects can be signaled by either one or two defect spikes, depending upon the sharpness of the two edges of the defect. Accordingly, while the total sensed defect spike count does not necessarily correspond with the existing defect total, product rejection is based upon the existence of single defect spikes, making it impossible for defective material to be passed as accepted product.) A "no spike" condition in the succeeding scan indicates a splice-type emulsion fault, since essentially no transmitted light then reaches the detector; in the reflection mode, the "no spike" signal would indicate a web break or roll run out "no product" condition.

Since the diffuse edge defect 112 shown in waveforms A and C does not produce a sufficiently strong differentiated signal response, because the more diffuse edge conditions produce a sloping rather than sharply rising signal, it will not be detected by sharp edge defect detector 24. Therefore, to extract the diffuse edge defect information from sequential waveform C the diffuse edge defect processor 25 uses the diffuse edge defect AUTOCAL gate N produced by the digital logic and gating circuit 44 to sample the amplitude of AUTOCAL pulse 45 to establish an AUTOCAL voltage reference level. As hereinbefore described, this reference signal, $A(t)$, is log ratioed with the product pedestal portion of sequential signal C which has been gated by product gate Q, formed by the digital logic and gating circuit 44. The calibrated log ratio signal output S is introduced to the diffuse edge defect detector 26, which filters out the $d$–$c$ component, discriminates the remaining $a$–$c$ component and, using product gate Q, gates the discriminated signal to produce diffuse edge defect signals 111c, 112a and 112b in waveform W. The emulsion fault 113a appearing in the right-hand waveform is not detected as a diffuse edge defect because it contains no significant a–c component. (It will be seen that, since the magnitude of sharp edge defect 111, which has been detected by the sharp edge defect detector 24 to produce signals 111a and 111b, exceeds the diffuse edge defect detector threshold 86, waveform TT, FIG. 6, it is also registered as a diffuse edge defect signal 111c.) The occurrence of these defect signals triggers alarm 92 and product rejection effectuation as hereinbefore described for the sharp edge defect detection system.

To extract the emulsion fault information from the calibrated log ratiod signal output S, emulsion fault detector 30 integrates the difference between the product pedestal portion of the signal S, which is gated by product gate Q, and its time-average value U. Reset signal G terminates the accumulation of the difference signals. Should the accumulated value, during each scan, exceed the preselected thresholds, an emulsion fault signal Y is generated which, in turn, causes the digital logic and gating circuit 44 to send out the emulsion fault hold signal X and trigger alarms 109 and product rejection action as hereinbefore described for the sharp edge and diffuse edge defect cases. This signal halts further time-averaging and replaces the time-averaged signal output with a "good product" reference XX developed in the emulsion fault hold circuitry 31. The "good product" reference level XX constitutes the last-known, best-calibrated, time-averaged signal prior to the defect-containing scan. The emulsion fault hold X and "good product" reference XX signals remain until the emulsion fault condition 113a no longer exists whereupon the digital logic and gating circuit 44 clears the emulsion fault hold signal X, thereby restoring the time-averaging of signal S.

From the foregoing, it will be understood that this invention can be utilized in many different embodiments, depending upon the radiation source employed (i.e., whether the emitted wavelength is in the infra-red, ultraviolet or visible light range), the type of inspection channel (i.e., reflection, transmission, or both) and the type of defect detector (i.e., sharp edge, diffuse edge, protracted duration or any combination thereof) required for the inspection of flaws in paper, polymers, glass, foils and other sheet mill products. Moreover, the format of the defect signals makes it possible for a computer to easily perform the functions necessary to speed product release times.

What is claimed is:

1. A flying spot inspection system for web materials comprising:
   a radiation source,
   means traversing a beam of radiation from said source in a scan across said web,
   electronic means responsive to said beam of radiation in either the reflection mode or the transmission mode with respect to said web detecting the existence of three general classes of defects and discriminating said defects as to class, consisting of:
   1. sharp edge defects,
   2. diffuse edge defects and
   3. protracted duration defects characterized by an amplitude-shifted pedestal of the optical-to-electrical transduction signal produced in said scan of said web,
   means responsive to said electronic means detecting said defects identifying web materials containing said defects and passing the remainder of said web materials as acceptable product, and
   automatic calibration means providing at the outset of each said scan said electronic means with an instantaneous basic reference voltage signal retained during the balance of each said scan determined by operation of said system with a preselected radiation attenuation filter replacing said web at the outset of said scan.

2. A flying spot inspection system for web materials according to claim 1 wherein said electronic means for detection and discrimination of said sharp edge defects comprises:
   electrical differentiation means for both web pedestal signals and for said instantaneous basic reference voltage signal whereby the differentiated value of said instantaneous basic reference voltage signal is retained for the duration of said scan, and
   means grading as nonpassable sharp edge defects which produce signal magnitudes in the differentiated pedestal signal exceeding a preselected scaled proportion of the retained differentated value of said instantaneous basic reference voltage signal.

3. A flying spot inspection system for web materials according to claim 1 wherein said electronic means for the detection and discrimination of said diffuse edge defects comprises:
   means obtaining the logarithmic ratio of the instantaneous pedestal signal amplitudes throughout each full web width scan and said instantaneous basic reference voltage signal amplitude retained for the duration of said scan,
   means comparing said logarithmic ratio with a preselected threshold voltage level of preselected polarity for grading diffuse edge defects, and
   means grading as nonpassable all diffuse edge defects having said ratio magnitudes exceeding said preselected threshold voltage level for grading diffuse edge defects.

4. A flying spot inspection system for web materials according to claim 1 wherein said electronic means for the detection and discrimination of protracted duration defects characterized by an amplitude-shifted pedestal of said optical-to-electrical transduction signal produced in said scan of said web comprises:
   means measuring during each full web width scan the difference between the instantaneous logarithmic ratio and the time-averaged value from many previous scans of said logarithmic ratio of the instantaneous pedestal signal amplitudes throughout each full web width scan to said instantaneous basic reference voltage signal amplitude retained for the duration of said scan,
   means integrating said difference with respect to time,
   means comparing the output of said integrating means with a preselected threshold voltage level of preselected polarity for grading said protracted duration defects, and
   means grading as nonpassable all protracted duration defects having integrated difference magnitudes exceeding said preselected threshold voltage level for grading said protracted duration defects.

5. A flying spot inspection system for web materials according to claim 4 provided with means whereby said time-averaged value of the logarithmic ratio of the instantaneous pedestal signal amplitude throughout each full web width scan and said instantaneous basic reference voltage signal amplitude retained for the duration of said scan is held in storage over a multiplicity of said scans during which time logarithmic ratios determined during subsequent scans in which nonpassable protracted duration defects are detected are barred from inclusion in said time-averaged value of said ratio.

* * * * *